March 6, 1934. C. M. DIBBLE Re. 19,102

FLUE CONSTRUCTION

Original Filed Aug. 4, 1928

Inventor:
Claude M. Dibble, Deceased
by Moore Brothers Company
Assignee, by Lewis Moore, President
John C. Carpenter
Atty.

Reissued Mar. 6, 1934

Re. 19,102

UNITED STATES PATENT OFFICE 19,102

FLUE CONSTRUCTION

Claude M. Dibble, deceased, late of Joliet, Ill., by Moore Brothers Company, Joliet, Ill., assignee Original No. 1,751,798, dated March 25, 1930, Serial No. 297,460, August 4, 1928. Application for reissue February 4, 1931, Serial No. 513,387

7 Claims. (Cl. 126—307)

This invention relates to a flue construction, and has for its general object to provide a flue by which back draft is prevented in a stove or other heater with which the flue is connected, but without material impairment of the normal forward draft from the stove through the flue, and which has a multiple capacity for being connected with various predetermined positions of the stack flue that discharges the exhaust gases from the stove into the outside atmosphere, yet without impairing the efficiency of operation of the flue in preventing such back draft.

Numerous other objects and advantages of the invention will be apparent as it is better understood from the following description, which, taken in connection with the accompanying drawing, discloses a preferred embodiment thereof.

Figure 1:
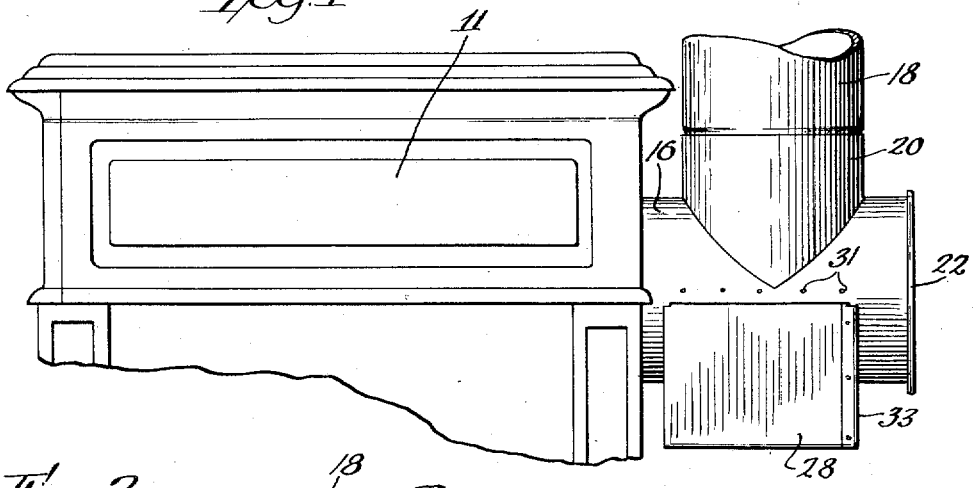
Figure 1 is a side elevational view, showing one form of flue constructed in accordance with the invention applied to a cabinet type of stove, such as is shown and described in my application for Letters Patent of the United States, for stove construction, filed by me on August 4, 1928, the serial number of which is 297,458.

The illustrative flue construction may be applied to various types of stoves and heaters for carrying off the exhaust gases to the chimney or stack and discharging them from the stove or heater into the outer atmosphere.

In the drawing, the flue construction is connected to the outlet of a cabinet type of gas stove 11. This constitutes one important application of the invention, not only because of the desirability of preventing back draft and possible extinguishment of the flame of gaseous fuel stoves, owing to the inherent danger involved as a result of accidentally extinguishing the fire, but also on account of the ready adaptability of the flue construction to several predetermined positions of the stack or chimney.

The illustrative flue construction includes a horizontal flue pipe 12, the inlet end 13 of which is mounted on the exhaust pipe 14 of the stove or heater 11. This exhaust pipe 14 may, if desired, project from one of the side walls of the stove, and be provided with a flanged or recessed end 15 of relatively smaller diameter to receive the overlapping end 16 of larger diameter of the horizontal flue pipe 12. After said flue pipe 12 has been mounted on the exhaust pipe 14, it may be secured in position thereon by a bolt and nut assembly 17 passed through aligned holes in the overlapping end and flanged end respectively of the flue pipe 12 and exhaust pipe 14.

The improved flue construction is adapted for attachment either to a vertically positioned stack or chimney 18 or an alternatively positioned horizontal stack, indicated in dotted lines at 19. For this purpose, a short vertical pipe section 20 is mounted over the top of the flue 12 and communicates with the interior of said flue. The outer end of the horizontal flue 12 is left open, when it is desired to connect said flue 12 with a horizontally positioned stack, such as indicated in dotted lines at 19. In either case, the stack or chimney flue, such as 18 or 19, may be provided with an inwardly flanged or recessed end 21 for insertion, as the predetermined location of the stack demands, into either the short vertical pipe section 20 or the open end of the horizontal flue pipe 12.

Figure 2:
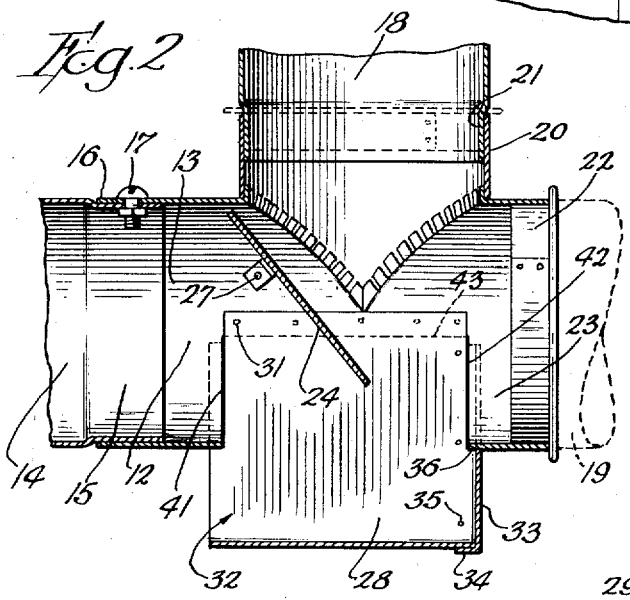
Fig. 2 is a longitudinal vertical section taken through the flue, shown in Fig. 1.

After the flue pipe 12 has been connected with the stack flue, the unconnected opening may be closed by a cover 22 which is adapted for insertion into the open end of either the pipe 12 or the vertical pipe section 20. In Fig. 2, the stack flue pipe 18 is connected with the vertical outlet 20 of the flue pipe 12, and the horizontal outlet 23 thereof is closed by the cover plate 22. On the other hand, in the alternative arrangement, the cover 22 is removed from the horizontal outlet 23 and the horizontal stack flue 19 inserted in its place. The cover 22, in this second arrangement, is applied to the vertical outlet provided by the short vertical pipe section 20, as indicated by dotted lines in Fig. 2.

Figure 3:
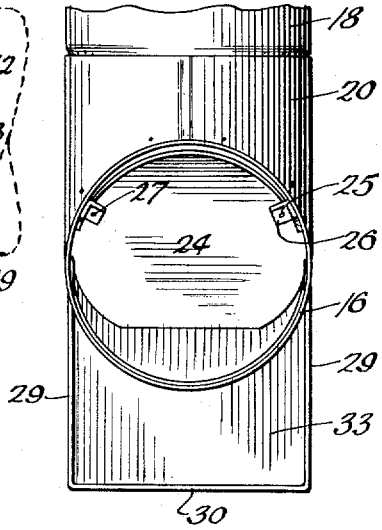
Fig. 3 is an end elevation of the flue construction, looking from the left and toward the right of Fig. 2.

Positioned within the horizontal flue pipe 12, substantially at the juncture of the vertical pipe section 20, with said horizontal pipe 12, is a baffle plate 24, secured, for example, by riveting it at 25 to ears 26 inwardly projecting from the opposite sides of the pipe 12, as shown in Fig. 3. These ears 26 may be, if desired, themselves riveted at 27 to the inner surface of the wall of the pipe 12.

The baffle 24 is disposed at such an angle within the pipe 12 that it would bisect the angle formed with hypothetical currents of gases flowing simultaneously backwards through the pipe 12 and the vertical pipe 20 and meeting in front of the baffle 24. Inasmuch as in the illustrative embodiment, the axis of the pipe 20 and its outlet is substantially vertical, and the axis of the pipe 12 and its alternative outlet 23 is substantially horizontal, the hypothetical meeting currents of backwardly flowing gases would come together at an angle of substantially 90°. Hence, the baffle 24, in this arrangement, is positioned below the inlet of the pipe 20 at an angle of substantially 45° to the axis of said pipe 20, and also at an angle of substantially 45° to the axis of the pipe 12. Therefore, in the event that any tendency should develop for a back draft to flow through either the vertical discharge pipe 20 or the horizontal discharge end 23 of the pipe 12, the baffle, because of its angularity, would intercept back draft, coming either vertically or horizontally, at substantially the same angle and thus is equally effective to arrest such back draft, whether the flue pipe 12 be connected to a vertical or alternatively to a horizontal stack flue or chimney.

The illustrative flue construction also provides for augmenting the draft in the forward or discharging direction, in order to offset any tendency which the baffle 24 might have toward choking or impairing the draft. As shown in Figs. 2 and 3, the bottom of the pipe 12 is provided with a cutaway opening 41, formed by cutting out the metal of the pipe 12 circumferentially along the lines 42 below the baffle 24 and next along the lines 43 which extend substantially parallel with the axle of the pipe 12 and join the terminals of the circumferential cuts 41. Into the opening 41 thus provided, a lateral box-like back pressure outlet flue 28 is inserted.

This flue 28 is provided with straight vertical side walls 29 joined together below the bottom of the pipe 12 by a substantially horizontal bottom 30. The side walls 29 of the outlet flue project within the pipe 12 above the horizontal edges 43 of the opening 41 and are riveted to the inner surface of the pipe wall, for example, as shown at 31. The forward end of said outlet flue 28 is open below the bottom of the pipe 12 to provide an outlet 32 for back draft, but the rear end of said flue is closed by a vertical closure plate 33. This closure plate 33 is provided with a surrounding rearwardly projecting flange 34 within which the rear ends of the vertical sides 29 and the horizontal bottom 30 project and are riveted, as shown for example at 35. The top edge 36 of said closure plate 33 is cut into a partially cylindrical shape to receive and engage the outer face of the bottom portion of the pipe 12 which projects rearwardly beyond the flue 28.

In the event of back-draft occurring, the baffle 24 would arrest such back-draft and cause it to be deflected from passing into the stove through the pipe 14, so that the back-draft would pass into the interior of the room through the outlet 32 instead of going back to the burner in the stove 11 and putting out the fire. Moreover, the existence of back-draft would be at once detected by the occupant of a room in which the stove or heater is operating, on account of the unpleasant odor of the noxious burned gases. This would signal for a temporary suspension of the operation of the stove or heater.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A flue construction, comprising a flue pipe having an inlet and a plurality of outlets individually connectable to a chimney, a closure for one of said outlets, and means associated with said flue pipe for diverting back draft of each said outlets from said inlet.

2. A flue construction, comprising a flue pipe having an inlet and a plurality of outlets individually connectable to a chimney, means associated with said flue pipe for diverting back draft of either said outlets from said inlet and a closure independently connectible to one of said outlets.

3. A flue construction, comprising a flue pipe having an inlet opening and outlet openings angularly arranged with respect to each other and separately usable, a closure for one of said outlet openings, and a back draft preventer common to said outlets.

4. A flue construction, comprising a flue pipe having an inlet opening and outlet openings angularly arranged with respect to each other and separately usable, a closure for one of said outlet openings, and a back draft preventer common to said outlets, said back draft preventer comprising a baffle fixed in angular relation to the axes of said outlets.

5. A flue construction, comprising a flue pipe having an inlet opening, a plurality of outlet chimney openings and a back draft outlet opening, a closure for one of said outlet chimney openings, and a baffle for directing back draft from said plurality of chimney outlet openings through said back draft outlet opening.

6. A flue construction, comprising a flue pipe having an inlet opening, a plurality of outlet chimney openings and a back draft outlet opening, a closure for one of said outlet chimney openings, a baffle for directing back draft from said plurality of chimney outlet openings through said back draft outlet opening, and means arranged at said back draft outlet opening for directing flue gases from said inlet opening to each said chimney outlet openings.

7. A flue construction, comprising a flue pipe having an inlet and a plurality of outlets, a closure for one of said outlets, and means associated with said flue pipe for diverting back draft from said inlet through a said outlet.

MOORE BROTHERS COMPANY,
*Assignee of Claude M. Dibble, deceased.*
By LEWIS MOORE,
*President.*